H. R. NEVENS, L. R. WALLACE & R. MARCY.
TRAIN STOP MECHANISM.
APPLICATION FILED MAY 26, 1914. RENEWED AUG. 4, 1917.

1,258,138.

Patented Mar. 5, 1918.

Witnesses.
E. W. Hamilton
B. J. Bishop

Inventors.
Herbert R. Nevens.
Lewis R. Wallace.
Richard Marcy.

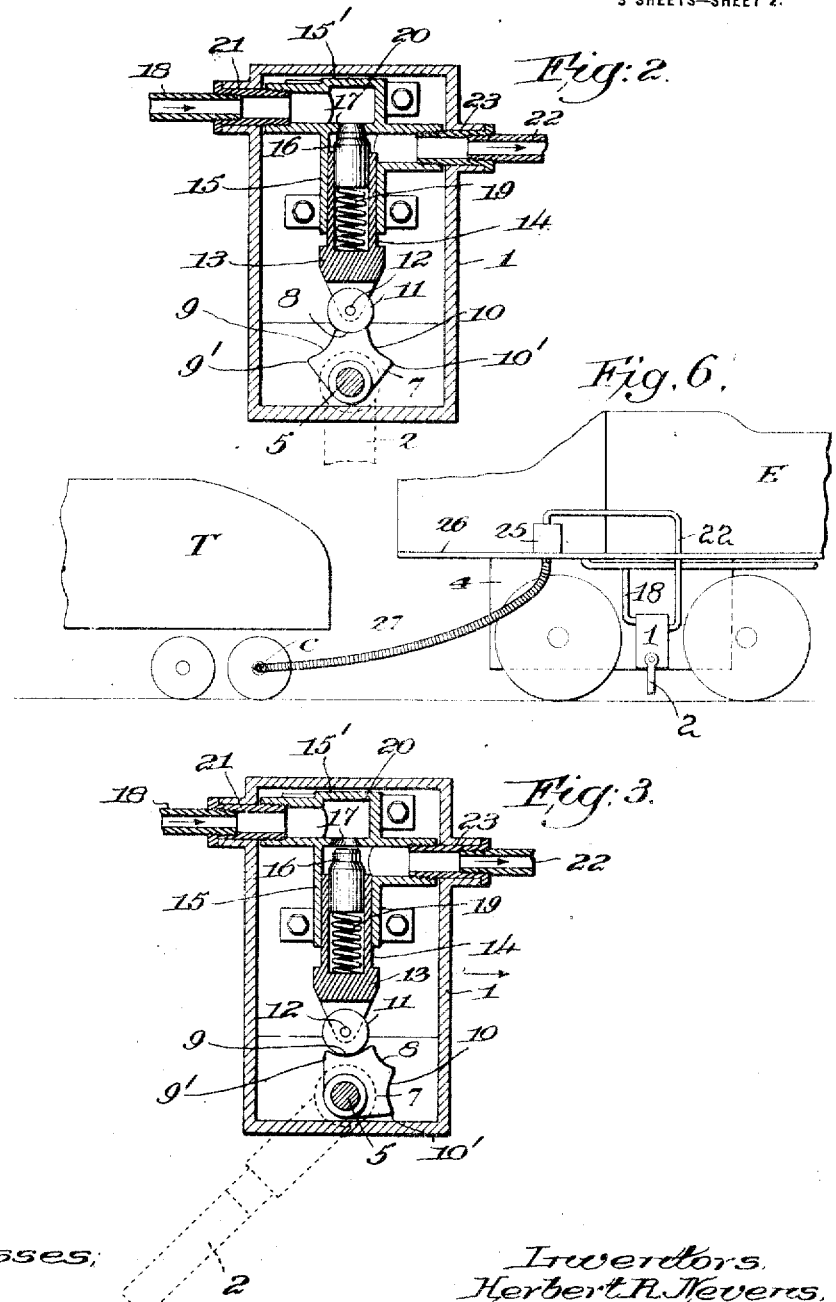

H. R. NEVENS, L. R. WALLACE & R. MARCY.
TRAIN STOP MECHANISM.
APPLICATION FILED MAY 26, 1914. RENEWED AUG. 4, 1917.

1,258,138.

Patented Mar. 5, 1918.
3 SHEETS—SHEET 3.

Witnesses,
B. I. Bishop
H. M. Barrett

Inventors,
Herbert R. Nevens,
Lewis R. Wallace,
Richard Marcy,
by Ellis Spear Jr.
Atty.

UNITED STATES PATENT OFFICE.

HERBERT R. NEVENS, OF DORCHESTER, LEWIS R. WALLACE, OF WALTHAM, AND RICHARD MARCY, OF LINCOLN, MASSACHUSETTS, ASSIGNORS TO NEVENS-WALLACE TRAIN CONTROL COMPANY, A CORPORATION OF MASSACHUSETTS.

TRAIN-STOP MECHANISM.

1,258,138.  Specification of Letters Patent.  Patented Mar. 5, 1918.

Application filed May 26, 1914, Serial No. 841,068. Renewed August 4, 1917. Serial No. 184,539.

*To all whom it may concern:*

Be it known that we, HERBERT R. NEVENS, LEWIS R. WALLACE, and RICHARD MARCY, citizens of the United States, residing at 35 Downer Ave., Dorchester, State of Massachusetts, Waltham, county of Middlesex, Commonwealth of Massachusetts, and Bedford Road, Lincoln, Commonwealth of Massachusetts, respectively, have invented certain new and useful Improvements in Train-Stop Mechanism, of which the following is a specification.

This invention relates to the positive control of railroad trains and the like for the purpose of preventing the neglect or disobedience of the usual signals employed in such systems.

Our present invention has for its object to provide an engine equipment whereby an application of the brakes will be secured in direct proportion to the speed at which the train is traveling when the track obstacle is struck. We attain this object by the use of a valve controlling the train line pressure and opening with the pressure to its fullest degree upon any actuation thereof, in combination with an independent speed governed relief operatively connected with the exhaust of said valve and continuously in ready adjustment for the proper relief at any particular time.

The construction and operation of our invention will be more fully disclosed in the specification that follows. In the drawings forming a part of that specification we have shown as an illustrative embodiment a form of equipment which not only clearly illustrates the principles involved but is in itself a construction proven to be satisfactory in practice. Throughout specification and drawings like reference numerals are correspondingly applied and in these drawings:

Fig. 2 and Fig. 3 are sections through the engine box of our invention and showing the trip valve in its two positions.

Fig. 6 is a partial view of a locomotive and its tender showing the installation, and Figs. 7 to 10 inclusive are detail views showing the connection for the flexible shaft with an axle of the tender whereby the governor is rotated at train speed.

Figure 1:
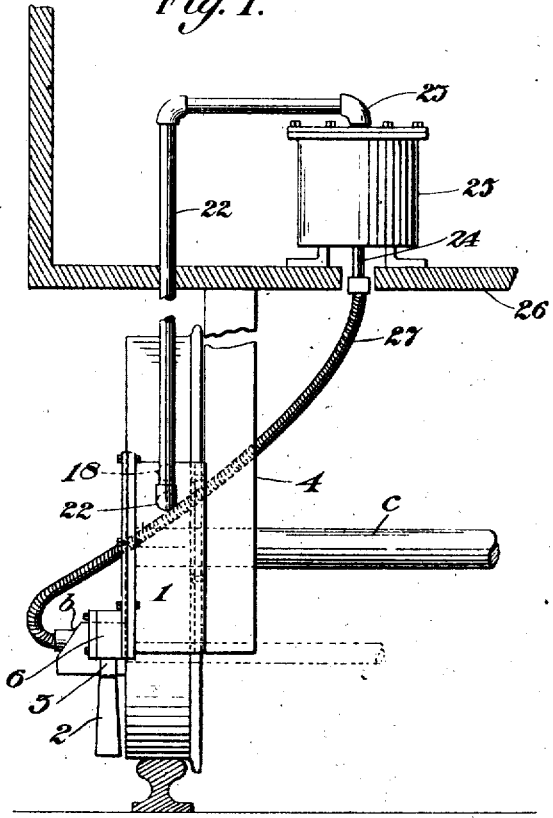
Figure 1 is a view showing an engine equipment in accordance with our invention.
Figure 7:
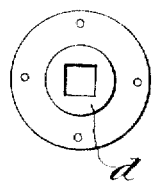
Figure 8:
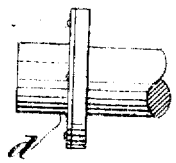
Figure 9:
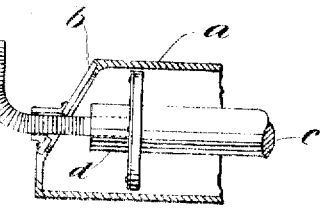
Figure 10:

We have indicated at 1 a box or casing adapted to be mounted on the truck 4 of an engine E so as to bring its trip arm 2 in position to strike an obstacle along the track-way when said track trip is set in danger position. The trip 2 is adjustably held in position. The trip 2 is adjustably held in a sleeve 3 by a slot and bolt connection which permits a relative vertical adjustment of the trip to shorten or lengthen its effective trip arm. The sleeve 3 is rigidly fastened on a transverse rock shaft 5 journaled in the lower end of the box.

The box at this end has a lateral casing 7 6 in which the sleeve is disposed so as to position the trip eccentrically of the box. The rock shaft near its opposite end has a cam 7 provided with a central curved face 8 and lateral curved faces 9 and 10. The face 8 is disposed in a plane above that of the faces 9 and 10 when the cam is in its normal position shown in Fig. 2. When so positioned the central face 8 receives and supports a cam roll 11 pinned at 12 in the lower bifurcated end 13 of a valve spindle 14 movable in a vertical guide and valve casing 15 secured to the box. The lateral faces 9 and 10 constitute locking depressions for the roll 11 when the trip has been actuated to effect a partial rotation of the rock shaft with a consequent oscillation of the cam and lowering of the valve spindle.

The lowering of the valve spindle 14 unseats a valve 16 guided within the tubular portion of the spindle and normally closing a valve port 17 in the head $15^1$ of the valve casing 15. The valve is held to its seat against the pressure in the train line pipe 18 by a coil spring 19 interposed between the valve and the base of the spindle 14.

Figure 4:
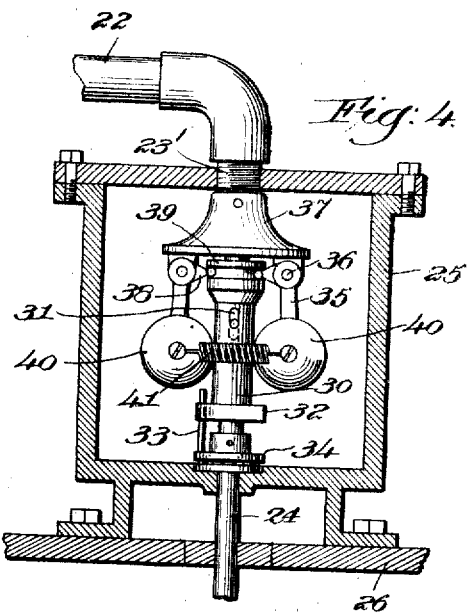
Fig. 4 is a vertical section through the cab box of our invention showing the speed governed relief and Fig. 5 is a view at right angles to Fig. 4.
Figure 5:
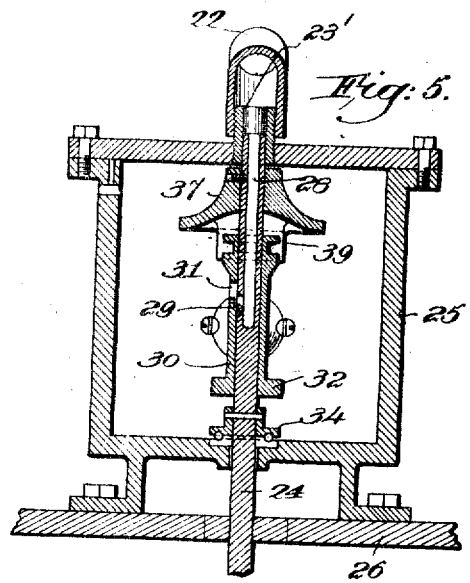

The train line pipe 18 supplies air under pressure to the valve chamber 20 of the casing head $15^1$. The pipe 18 is threaded into a nipple 21 which connects with the head $15^1$. When the valve is released it opens with the pressure to its fullest degree. The air passes through the port 17 into a delivery pipe 22 connected with the exhaust of the valve by a nipple 23 on the opposite side of the casing head. With this arrangement we secure a full opening of the valve with the pressure upon any actuation of the trip and an automatic locking of the valve in open position where it will remain until reset. The specific valve arrangement described forms the subject matter of a separate application. It is preferably used in the present invention however for the reason that it combines very satisfactorily with the relief controlling mechanism shown in detail in Figs. 4 and 5. Obviously however, any other valve arrangement could be used.

The delivery pipe 22 connects at 23¹ with a speed governed relief control to secure an application of the brakes in proportion to the speed at which the train is traveling when the valve is opened. This controlling mechanism consists of a shaft 24 rotatably journaled in a casing 25 mounted on the cab 26 of the engine E and driven by the flexible shaft 27 which may be driven in any manner but which by preference is coupled with and driven from one axle $c$ of the tender T as shown in Figs. 6 to 10 inclusive. The shaft 24 has an axial bore 28 connecting at its upper end with the pipe 22. The bore is vented near its lower end by a port 29 controlled by a slide valve 30 guided on the shaft 24 and rotating therewith. The slide 30 has a port 31 which always partially registers with the port 29 so as to secure a service application of the brakes whenever the valve 16 is opened. The degree of registry of the ports is controlled by the movement of the slide. The connection between the slide and the shaft whereby the slide rotates with the shaft is effected by means of a collar 32 on the slide and a pin 33 guided at one end in a hole in the collar and fixed at its other end in the upper half of a ball bearing 34 fastened to the shaft. The pin 33 in addition to connecting the slide and shaft assists to guide the slide in its sliding movement on the shaft.

The movement of the slide is controlled according to the speed of the train so as to secure a venting of the bore 28 and a consequent brake application in proportion to the train speed. This is effected by a centrifugally acting device connected to the slide to rotate therewith. The device consists of a pair of weighted arms 35 pivoted at 36 in ears depending from a hanger 37 fastened to the shaft 24. The arms 35 are connected by links 38 with a collar 39 fixed on the slide 30. The weights for the arms 35 are indicated by the numeral 40. As the speed of the train increases the arms 35 by centrifugal force tend to assume a horizontal position. This draws the slide down bringing the port 31 into full register with the port 29 in proportion to the speed of the train. Should the trip 2 be struck at this time by the track obstacle the valve 16 will be fully opened to admit full train line pressure to the bore 28. The exhaust from the bore is controlled by the position of the slide at the time of the opening of the valve.

Where a train is proceeding at or below a certain rate of speed, for example fifteen miles an hour, it is not desired to secure an emergency application of the brakes but simply to have a service application. This is effected in the present invention by making the centrifugally acting device inoperative at all speeds below the predetermined speed and by having the ports 29 and 31 always partially in register to give a service application whenever the valve is opened. For this purpose the weighted arms 35 are linked together by a coil spring 41 of a tension sufficient to overcome the centrifugal force developed at fifteen miles an hour and hold the arms together thereby preventing the slide from moving down and uncovering the port 29 to a greater degree. The spring is not strong enough to resist the centrifugal force developed at speeds over the predetermined speed and the slide is therefore free to move and uncover the port 29 to a degree proportionate to the degree of separation of the weights 40.

In use the trip is normally disposed in the position shown in Fig. 1. In this position the valve 16 is held closed against the train line pressure by the cam face 8 which is disposed in supportive relation to the valve spindle. When the trip strikes the track obstacle an actuation is given it effective to rock the shaft 5 and move the cam face 8 of the cam 7 out from under the spindle. The support for the spindle being thus removed, the spindle is lowered by its own weight, unseating the valve 16 and permitting passage of the air under pressure from the train line pipe 18 to the exhaust pipe 22. The spindle is lowered gradually, the roll 11 riding down either the face 9 or the face 10 (depending upon the direction in which the train is traveling) until it rests against either the shoulder 9¹ or 10¹ thereof. When so positioned the trip is locked and in the embodiment shown must be reset manually. The exhaust of the air through the ports 29 and 31 of the relief controlling mechanism is governed by the position of the slide 30 which in turn is governed by the speed of the train from the centrifugal device 35. In this way an application of the brakes commensurate with the speed of the train is secured.

The parts are reset after an actuation by the engineer who in the present invention must descend from the cab and manually close the air valve. This is considered a valuable feature in train stop equipment in that it insures a positive resetting of the device before the train can proceed. Obviously, however, a resetting arrangement operative from the cab might be provided if considered desirable.

Various other modifications in the form and construction of our device may obviously be made without departing from the spirit of the invention if within the limits of the appended claims.

In Fig. 6 we have shown the means for communicating power to the governor from the axle of the tender through the flexible shaft 27, this view being simply for the purpose of showing the connection between the axle of the tender and the governor. The governor casing is shown at 25 in this figure. In the detail Figs. 7 to 10 we have shown the specific connections, the axle of the tender being shown at c, the box at a, and in order to couple flexible shaft 27 to the axle c we use a socket plate d secured to a disk carried on the end of the axle c. A plate b covers the opening to the axle box and the end of the flexible shaft passes through an opening in this cover plate to the socket plate d.

What we therefore claim and desire to secure by Letters Patent is:

1. In a signaling device, a valve operatively connecting with the air system of a train and opening with the pressure, means for holding said valve closed against said pressure, a release for said holding means to permit the full opening of said valve upon any actuation thereof, and an independent relief controlling mechanism operatively connected with the exhaust of said valve and normally partially open to permit a predetermined minimum brake application upon an effective actuation of said pressure control valve.

2. In a signaling device a valve operatively connecting with the air system of a train and opening with the pressure, means for holding said valve closed against said pressure, a release for said holding means to permit the full opening of said valve upon any actuation thereof, and an independent speed governed relief controlling mechanism operatively connected with the exhaust of said valve and normally partially open to permit a predetermined minimum brake application upon an effective actuation of said pressure control valve.

3. In a signaling device a valve operatively connecting with the air system of a train and opening with the pressure, means for holding said valve closed against said pressure, a release for said holding means to permit the full opening of said valve upon any actuation thereof, an independent relief controlling mechanism operatively connecting with the exhaust of said valve and normally partially open to permit a predetermined minimum brake application upon an effective actuation of said pressure control valve, and a centrifugally acting device associated with said control for securing a brake application in proportion to the train speed.

4. In a signaling device, a valve operatively connecting with the air system of a train and opening with the pressure and normally held closed against the pressure, means for releasing said valve to permit the full opening thereof upon any actuation, and an independent relief controlling mechanism operatively connected with the exhaust of said valve and comprising a pressure vent and a valve in controlling relation thereto, said vent and valve therefor normally partially open to permit a predetermined minimum brake application upon an effective actuation of said pressure control valve, and means for opening said valve controlling said pressure vent to a degree beyond its normal degree of opening whereby to secure an exhaust of said pressure in proportion to the train speed.

5. In a signaling device, a valve operatively connecting with the air system of a train and opening with the pressure and normally held closed against the pressure, means for releasing said valve to permit the full opening thereof upon any actuation, an independent relief controlling mechanism operatively connected with the exhaust of said valve and comprising a pressure vent and a governing slide therefor, said vent and slide therefor normally partially open to permit a predetermined minimum brake application upon an effective actuation of said pressure control valve and means for moving said slide relative to said vent to open said vent beyond its normal degree of opening whereby to secure an exhaust of said pressure in proportion to the train speed.

6. In a signaling device, a valve operatively connecting with the air system of a train and opening with the pressure and normally held closed against the pressure, means for releasing said valve to permit the full opening thereof upon any actuation, an independent relief controlling mechanism operatively connected with the exhaust of said valve and comprising a pressure vent and a slide valve in controlling relation thereto, said vent and slide valve normally partially open to permit a predetermined minimum brake application upon an effective actuation of said pressure control valve, and centrifugally acting means operatively associated with said slide valve for securing an exhaust of said pressure in proportion to the train speed.

7. In a signaling device, a valve operatively connecting with the air system of a train and opening with the pressure, an independent relief controlling mechanism operatively connected with the exhaust of said valve, and comprising a pair of vent members, rotatably mounted, one of said members slidable relative to the other, and centrifugally acting means connected with said slidable member for governing the venting of said controlling mechanism in proportion to the train speed.

8. In a signaling device, a valve operatively connecting with the air system of a train and normally closed but opening fully upon any actuation thereof, and a relief controlling mechanism operatively connected with the exhaust of the valve and comprising a pair of vent members normally set in predetermined venting relation to each other to permit a predetermined minimum brake application upon an effective actuation of said pressure control valve, one of said members slidable relative to the other to secure a vent in excess of the predetermined vent for which the members are initially set, and means for effecting a sliding movement of said sliding member relative to the other vent member to secure a brake application in proportion to the train speed whenever said speed exceeds said predetermined venting point.

9. In a signaling device, a valve operatively connecting with the air system of a train and normally closed but opening fully upon any actuation thereof, and a relief controlling mechanism operatively connected with the exhaust of the valve and comprising a pair of vent members normally set in predetermined venting relation to each other to permit a predetermined minimum brake application upon an effective actuation of said pressure control valve, one of said members slidable relative to the other to secure a vent in excess of the predetermined vent for which the members are initially set, and centrifugally acting means operatively connected with said sliding member for effecting a sliding movement thereof to secure a brake application in proportion to the train speed whenever said speed exceeds said predetermined venting point.

10. In a signaling device, a valve operatively connecting with the air system of a train and normally closed but opening fully upon any actuation thereof, and a relief controlling mechanism operatively connected with the exhaust of the valve and comprising a pair of vent members normally partially open to permit a predetermined brake application upon an effective actuation of said pressure control valve, one of said members slidable relative to the other, and speed governed means operatively connected with said sliding member for effecting a sliding movement thereof in proportion to the train speed.

11. In a signaling device, a valve operatively connecting with the air system of a train and normally closed but opening fully with the pressure upon any actuation thereof, and a relief controlling mechanism operatively connecting with the exhaust of said valve and comprising a pressure vent member having a vent opening, a valve slidable relative to said vent member, said valve having a vent opening normally disposed in partial venting relation to said vent opening of the vent member to permit a predetermined minimum brake application upon an effective actuation of said pressure control valve, and speed governed means operatively connected with said slide valve to move said slide and vent said vent member to a degree proportionate to the train speed.

12. In a signaling device, a valve operatively connecting with the air system of a train and normally closed but opening fully with the pressure upon any actuation thereof, and a relief controlling mechanism operatively connecting with the exhaust of said valve and comprising a rotating pressure vent member having a vent opening, a valve rotating with said vent member and slidable thereon when said vent member attains a predetermined rate of revolution, said valve having a vent opening normally disposed in partial venting relation to said vent opening of the vent member, and speed governed means operatively connected with said slide valve and becoming effective when said vent member attains said predetermined rate of revolution to move said slide valve and thereby uncover said vent opening to a degree proportionate to the train speed.

13. In a signaling device, a valve operatively connecting with the air system of a train and a relief controlling mechanism connected with the exhaust of said valve and comprising a rotating pressure vent member having a vent opening, a valve rotating with said vent member and slidable thereon when said member attains a predetermined rate of revolution, said valve having a vent opening normally disposed in partial venting relation to said vent opening of the vent member, and centrifugally acting means operatively connected with said slide valve and becoming effective when said vent member attains said predetermined rate of revolution to move said slide valve and thereby uncover said vent opening to a degree proportionate to the train speed.

In testimony whereof we affix our signatures in presence of witnesses.

HERBERT R. NEVENS.
LEWIS R. WALLACE.
RICHARD MARCY.

Witnesses to signature of Wallace and Marcy:
MARION C. HOBBS,
VICTORIA LOWDEN.

Witnesses to signature of Nevens:
JOSEPH BARR,
SOLOMON ELSNER.